United States Patent [19]
Smith et al.

[11] 3,824,667
[45] July 23, 1974

[54] HYDRAULIC VALVE SEAT EXPANDER

[75] Inventors: Joseph W. Smith; Eugene A. Hollencamp, both of Dayton, Ohio

[73] Assignee: Carrier Corporation, Syracuse, N.Y.

[22] Filed: June 5, 1973

[21] Appl. No.: 367,259

[52] U.S. Cl. ............................................. 29/200 B
[51] Int. Cl. ............................................. B23p 19/00
[58] Field of Search............ 29/200 B, 200 R, 200 P

[56] References Cited
UNITED STATES PATENTS
2,343,043  2/1944  Brugmann ........................ 29/200 B
2,737,996  3/1956  Toth ................................. 29/200 B Primary Examiner—Thomas H. Eager
Attorney, Agent, or Firm—J. Raymond Curtin

[57] ABSTRACT

A valve seat liner ring formed of relatively thin material is positioned in a valve body in registration with a valve seat. The valve body is rotated. A circular series of liner ring expanding and forming rolls are carried by a support plate and moved in the valve with the rolls in registration with the liner ring. A roll mover is connected to each roll. The roll movers are operable when actuated to move the rolls radially outward into engagement with the liner ring to expand the same against the seat and form the liner ring in close engagement with the seat. The roll movers are preferably in the form of fluid operated piston and cylinder structures.

5 Claims, 5 Drawing Figures

HYDRAULIC VALVE SEAT EXPANDER

BACKGROUND OF THE INVENTION

In certain installations it is highly desirable to form a valve seat out of material that is more resistant to wear and pitting than the material from which the valve body is made. It is customary in fabrication of such valves to machine the valve for the reception of the seat and then machine a seat from the desired material and insert the same in the valve body. This procedure greatly increases the cost of manufacturing the valve. The seat which is of substantial cross-sectional dimension has to be precision machined separately from the valve and subsequently installed in the valve body. The machining of the expensive materials, such as stainless steel, adds to the cost of the material that is necessarily wasted in the machining operation and the subsequent assembling of the formed seat in the valve body results in consumption of time and labor.

This invention is directed to apparatus for fixing a valve seat liner ring formed of relatively thin material in a valve body having a seat machined in the body. The valve seat liner ring is fixed in the valve body without removing the valve body from the machine on which the body was machined.

SUMMARY OF THE INVENTION

Means are arranged within the interior of the valve body for supporting the valve seat liner ring in registration with a machined seat area of the valve. An annular series of rollers are carried by a support plate which is lowered into the valve with the rollers arranged in registration with the machined seat area. The rolls are moved radially outward on the support plate into engagement with the ring expanding the ring into engagement with the machined seat and forming and expanding the ring into snug engagement with the seat area. The walls are moved into engagement with the liner ring by fluid operated piston and cylinder structures carried by the support plate.

DESCRIPTION OF THE PREFERRED EMBODIMENT

Figure 1:
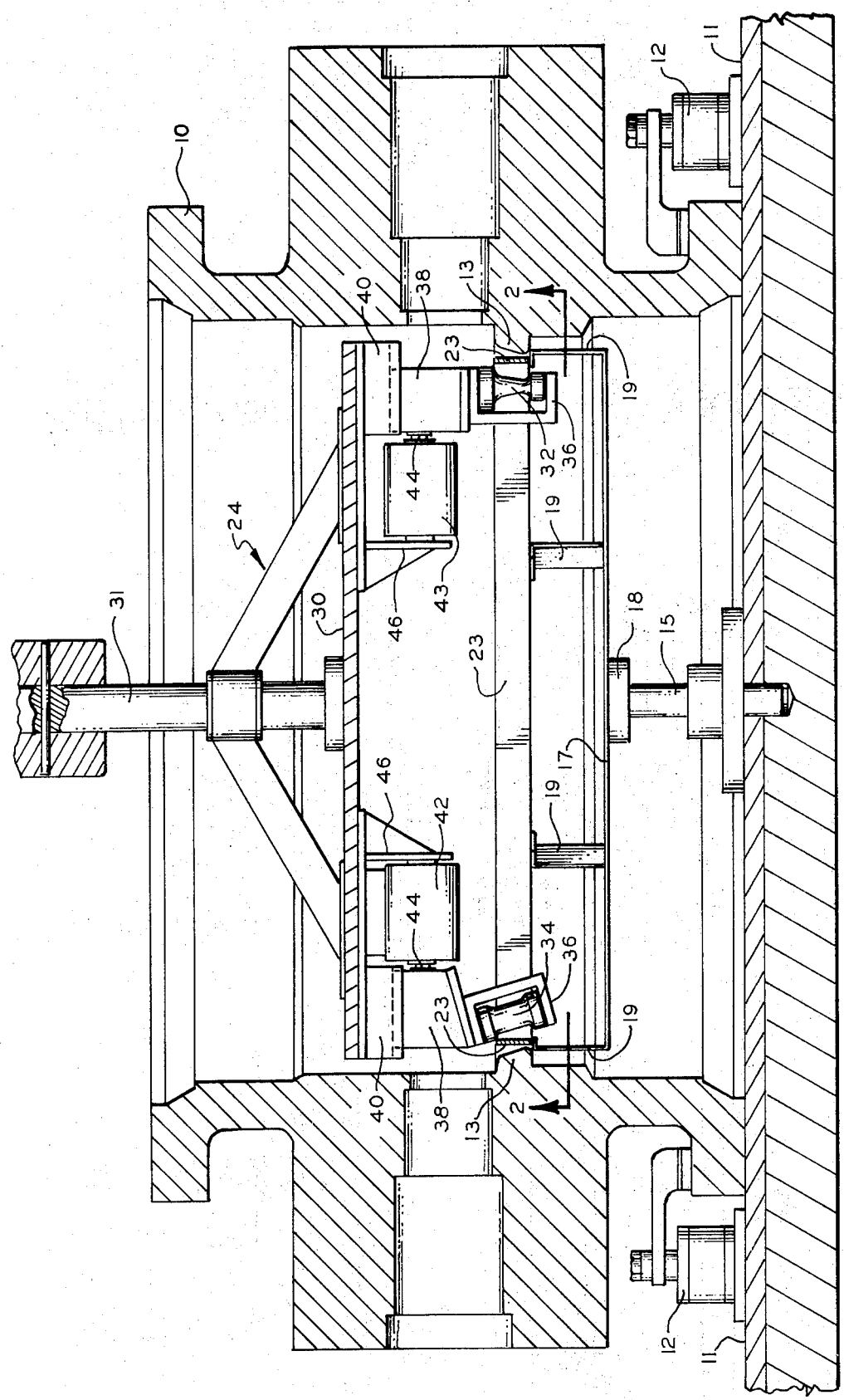
FIG. 1 is a cross-sectional view of a valve body and includes the apparatus embodied in my invention for fixing a valve seat liner ring in the body.

Referring to FIG. 1, the valve body 10 is fixedly clamped to the rotating table 11 of a machine tool such as a vertical boring mill. The valve body is clamped to the table by hold-down clamps 12. The valve body 10 is machined to form an annular internal ridge 13 which would normally serve as a valve seat for the valve.

After the valve body 10 has been machined, a pedestal 15 is mounted and centered on table 11. A spider 17 is mounted on the pedestal 15 by an anti-friction bearing 18. A plurality of resilient fingers 19 are attached to the periphery of the spider member 17 and extend outwardly and provide means for positioning a valve seat liner ring 23 in registration with the ridge 13. The liner ring 23 is expanded against the ridge 13 and formed in snug engagement therewith by a series of rolls carried by a supporting means 24, as shown in FIG. 1. The supporting means is in the form of a circular plate 30 fixed at its axis to a stem 31. The stem 31 is adapted to be mounted and supported in the boring mill in place of the forming tool used to machine the body 10.

Figure 3:
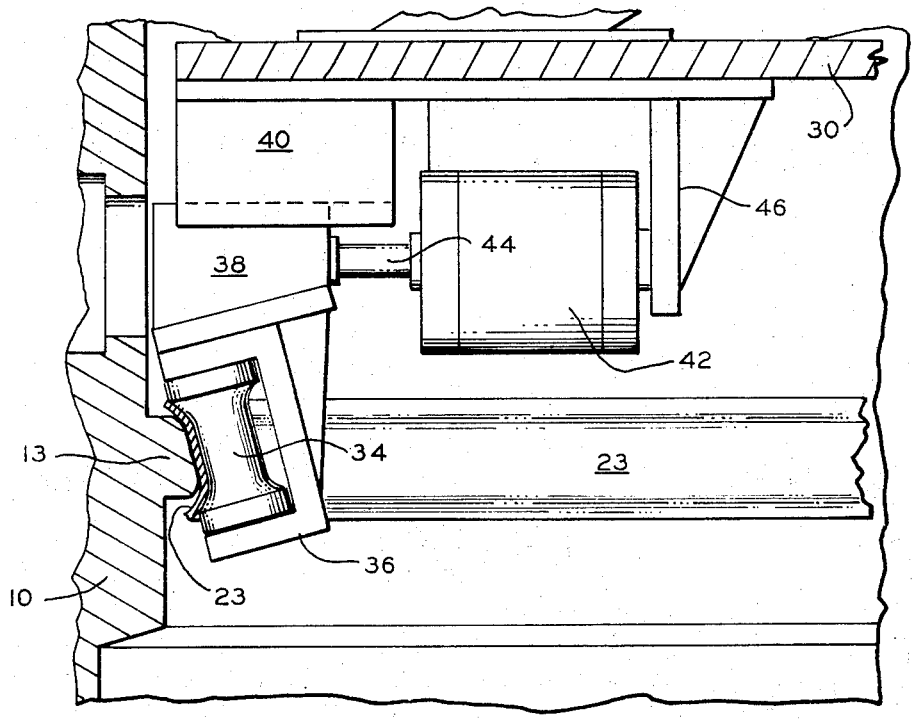
FIG. 3 is an enlarged view of an expanding roll and associated supporting structure as shown at the left area of FIG. 1 with the expanding roll moved into engagement with the valve seat lining ring.
Figure 4:
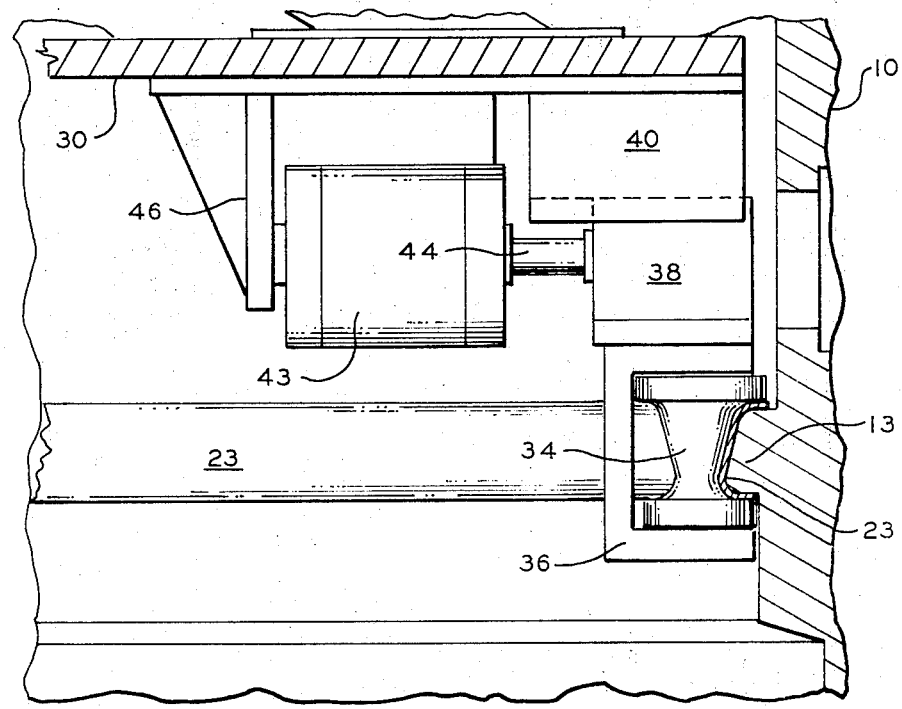
FIG. 4 is a view similar to FIG. 3 illustrating a forming roll as shown at the right portion of FIG. 1 with the roll moved into engagement with the valve seat liner ring.

Rollers 32 shown in FIG. 1 are forming rollers. Alternately or interleaved between the forming rollers 32 are a series of expanding rollers 34. The relative location of the forming rollers 32 and the expanding rollers 34 can be seen in FIG. 2. The shape of the expanding rollers 34 and the forming rollers 32 is illustrated in FIGS. 3 and 4, respectively. As can be seen in FIGS. 3 and 4 and FIG. 1, the rollers 32 and 34 are rotatably journaled in a channel or yoke member 36. The yokes 36 are secured to individual slide blocks 38 which have a mating configuration such as a dovetail or T-shaped upper face which mates with a similar configuration in a mounting member 40. The sliding blocks 38 are radially movable inwardly and outwardly relative to the mounting members 40 and are supported from the mounting members 40. The mounting members 40 are secured to brackets 46 on the bottom of the circular plate 30 in a position whereby movement of the sliding blocks 38 will move the rollers 32 and 34 into and out of engagement with a liner ring 23 positioned adjacent to the valve seat or ridge 13. The entire support means 24 is vertically positionable within the valve body 10 by moving the stem 31 upwardly and downwardly within the mounting structure of the vertical boring mill to thereby vertically position the rollers 32 and 34 in alignment with the ridge 13.

Figure 2:
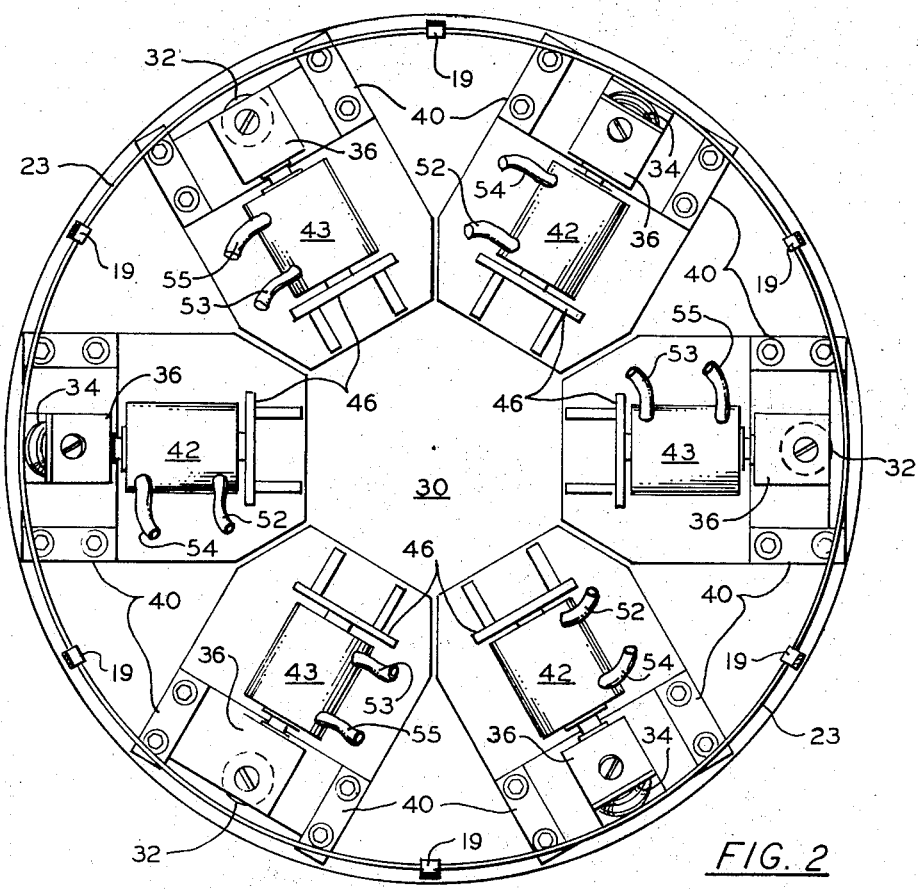
FIG. 2 is a view taken on line 2 to FIG. 1.

As illustrated in FIGS. 1 and 2, a series of hydraulic or fluid cylinders 42 and 43 are also suspended from the bottom of the circular plate 30 immediately adjacent each of the sliding blocks 38. The cylinders 42 are adjacent the forming rollers 32 and the cylinders 43 are adjacent the expanding rollers 34. The piston rods 44 of the cylinder 42 are secured to the sliding blocks 38 to provide radial movement of the sliding blocks 38 relative to the mounting members 40. The cylinders 42 are secured to the brackets 46 suspended from the bottom of the circular plate 30. The brackets 46 are adjustably mounted on the bottom of the circular plate 30 so that the radial position of the brackets may be varied inwardly or outwardly to accommodate various size valve bodies and liner rings. Radial movement of the brackets 46 will change the relative radial position of the rollers, sliding blocks, mounting members and hydraulic cylinders.

Figure 5:
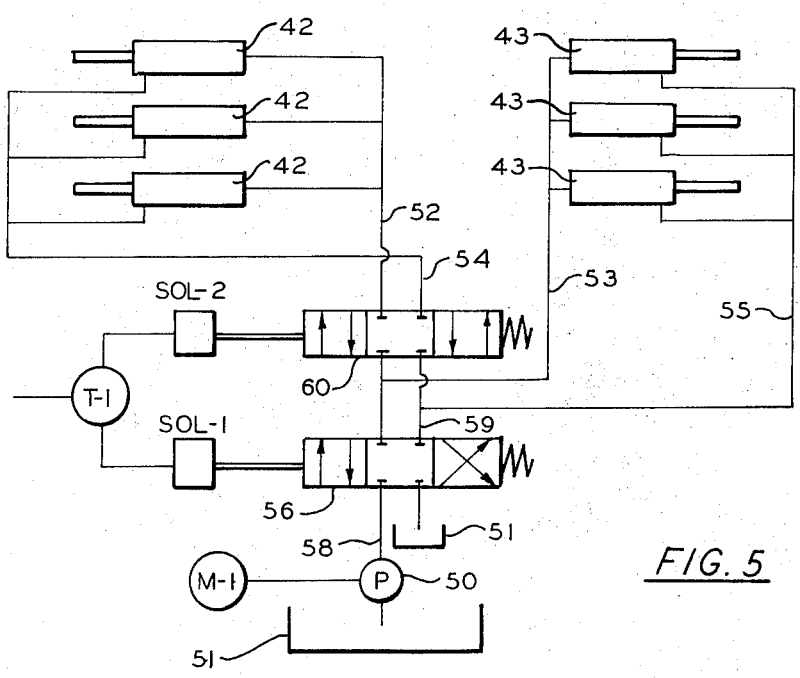
FIG. 5 is a schematic diagram of a hydraulic operating circuit suitable for use in the apparatus shown in FIG. 1.

The operation of the apparatus shown in FIG. 1 is best understood by referring also to the hydraulic circuit shown in FIG. 5. In the particular apparatus disclosed herein there are shown three forming rollers and three expanding rollers together with three cylinders 42 and three cylinders 43. However, the actual number of rollers and cylinders may be varied according to the particular material used in the liner ring 23. The hydraulic lines, pumps and valves may be mounted on the support means 24 above the circular plate 30 for convenience purposes. The actual location of these members does not constitute part of the invention and may be located remotely of support means 24 if so desired. As seen in FIG. 5, a pump 50 is provided to supply hydraulic fluid under pressure to the various cylinders 42 and 43. High pressure fluid is provided from a reservoir 51 to the head end of the cylinders 42 and 43 through lines 52 and 53 respectively. Fluid is returned to the reservoir 51 from the rod end of the cylinders 42 and 43 through lines 54 and 55 respectively. A first spool valve 56 is mounted in lines 58 and 59 which extends from the pump 50 and reservoir 51 to the head end supply lines 52 and 53 and the rod end supply lines 54 and 55. A second spool valve 60 is mounted in the forming cylinder supply lines 52 and 54.

The spool valves 56 and 60 are control valves which regulate the flow of fluid from the pump 50 to the cylinders 42 and 43. Valve 56 is separated by a solenoid Sol-1 and valve 60 is separated by solenoid Sol-2. Actuation of the solenoids Sol-1 and Sol-2 is controlled by an electrical timer T-1. The electrical circuitry required to separate the timer and solenoids Sol-1 and Sol-2 is not shown herein. However, a conventional electrical circuit which actuates a motor M-1 which drives pump 50 and provides electrical energy to the timer T-1 and the solenoids Sol-1 and Sol-2 would be used. Such a circuit, of course, would encompass an ON-OFF switch and any appropriate safety or interlocks desired. Closing the circuit would start the motor M-1 to drive the pump 50 and would actuate the timer T-1. Power is immediately supplied to the solenoid Sol-1 which in turn moves the valve 56 to the right providing high pressure fluid to the head end of the cylinders 43 and allowing fluid from the rod end of the cylinders to return to the reservoir 51. High pressure fluid is not provided to the forming cylinders 42 at this time. The high pressure fluid in the head end of the cylinders 43 forces the expanding rollers 34 radially outward relative to the mounting members 40 and into engagement with the liner ring 23. As seen in FIG. 1, the expanding rollers 34 are mounted 120° apart and will force the ring 23 outwardly into engagement with the ridge or valve seat 13. At this time or just prior to the operation of the hydraulic circuit, the drive motor in the boring mill is turned on causing the mill table 11 and the valve body 10 to rotate. The support means 24 is held stationary so that the expanding rollers 34 are not rotated. Engagement of the liner ring 23 by the expanding rollers 34 tends to force the expanding ring outward against the ridge 13 and cause the expanding ring to rotate with the valve body 10. The pedestal 15 of the valve ring support means is either secured to or resting on the table 11 and thus tends to rotate with the table 11. The fingers 19 which support the liner ring 23 will engage the yoke 36 which retards the rotational movement of the fingers 19. The pedestal 15 continues to rotate in bearing 18 relative to the fingers 19. As the ring 23 rotates with the valve body 10, the expanding rollers 34 roll along the surface of the ring 23 molding the ring into engagement with ridge 13.

The timer T-1 is preset to allow a predetermined number of rotations of the liner ring relative to the expanding rollers. Upon completion of the set time for the timer T-1, the solenoid Sol-2 is actuated moving the valve 60 to the right allowing high pressure fluid to flow to the head end of the cylinders 42 and fluid from the rod end of the cylinders 42 to return through the valve 60 and valve 56 to the reservoir 51. Movement of the cylinder 42 forces the sliding blocks 38 on the forming roll assemblies to move radially outward relative to the mounting members 40. The rollers 32 are thus urged into pressure contact with the liner ring 23 and forms or expands the liner ring 23 around the ridge 13.

Timer T-1 has been set with a predetermined time to allow sufficient rotation of the liner ring 23 relative to the forming rollers 32 to completely expand and form the liner ring to the contour of the ridge 13. Upon expiration of the predetermined time set in timer T-1, both solenoids Sol-1 and Sol-2 are energized in the reversed direction moving valves 56 and 60 to the left as shown in FIG. 5 so that high pressure hydraulic fluid is now directed to the rod end of the cylinders 42 and 43 and the fluid in the head end of cylinders 42 and 43 is returned to the reservoir 51. The movement of the cylinders 42 and 43 retracts the sliding blocks 38 and the rollers 32 and 34 to its original position whereby the entire assembly may be withdrawn from the valve body 10. Upon completion of the movement of the rollers 32 and 34 to their original postion, the timer T-1 cuts off the power to the solenoids Sol-1 and Sol-2 and the valves 56 and 60 are returned to their original position under the action of springs operably associated with each valve.

The embodiment disclosed herein has been shown as a two-step operation whereby expanding rollers first force the liner ring against the valve seat and forming rollers contour the ring around the valve seat. It should be understood that the number of steps required to expand and form the ring will depend upon the hardness and type of material used in the liner ring and may be varied as required. For example, it may be desirable to form a three-step operation whereby the hydraulic circuit would encompass a third set of cylinders and a third control valve to allow the three-step movement of three differently shaped rollers. Alternatively, if softer material is used, then all the rolls may be forming rolls and the valve 60 may be omitted.

It will be noted that the apparatus functions to quickly and appreciably attach the liner 23 to the valve body without removing the valve body from the machine tool on which it was machined.

While the invention has been described by reference to the structure disclosed herein, it is not confined to the specific details set forth since it is apparent that many modifications and changes can be made by those skilled in the art. This application is thereby intended to cover such modifications or changes as may come within the purpose of the improvements or scope of the following claims.

What is claimed is:

1. Apparatus for securing a liner ring to a valve seat in a valve body including
   a rotatable table adapted to fixedly support a valve body for rotation with the table about the axis of the seat,
   means to support a liner ring within the valve body in a position to be expanded into engagement with a valve seat within the valve body,
   a support plate mounted above the rotating table and adapted to be moved into the valve body, a plurality of rollers suspended from the support plate and movable radially outward into engagement with the liner ring, hydraulic means to force the rollers radially outward into pressing contact with the liner ring to force the liner ring against and around the valve seat in the valve body, and means to turn the rotatable table and valve body relative to the support plate and the rollers.

2. Apparatus for securing a liner ring to a valve seat in a valve body including a rotatable table adapted to fixedly support a valve body for rotation, with the table, about the axis of the seat, means to support a liner ring within the valve body in a position to be expanded into engagement with a valve seat within the valve body, a support plate mounted above the rotating table and adapted to be moved into the valve body, a plurality of expanding rollers suspended from the support plate and movable radially outward into engagement with the liner ring, a plurality of forming rollers suspended from the support plate between each of the expanding rollers and adapted to be moved radially outward into contact with the liner ring, hydraulic means to force the expanding rollers and forming rollers radially outward into pressing contact with the liner ring to force the liner ring against and around the valve seat in the valve body, and means to turn the rotatable table and the valve body relative to the support plate and the expanding and forming rollers.

3. The apparatus as set forth in claim 2 wherein the means to move the expanding rollers and forming rollers radially outward includes hydraulic cylinder means operably associated with each roller and a hydraulic circuit including timing and valving means to first move the expanding rollers into contact with the liner ring for a predetermined length of time and then move the forming rollers into contact with the liner ring for a predetermined time.

4. The apparatus as set forth in claim 2 wherein the expanding rollers and forming rollers are mounted in yoke members which are suspended from radially movable blocks slidably supported relative to the support plate, and the hydraulic means includes a plurality of hydraulic cylinders mounted from the support plate and coupled to the movable blocks to move the block of each expanding and forming roller radially inward and outward.

5. The apparatus of claim 4 further including timing means to control the operation of the hydraulic cylinders to force the expanding rollers and forming rollers into timed sequential contact with the liner ring to thereby force the liner ring into pressing contact with the valve seat in the valve body.

* * * * *